United States Patent [19]
Bouchard et al.

[11] Patent Number: 5,704,760
[45] Date of Patent: Jan. 6, 1998

[54] METHOD AND APPARATUS FOR IMPROVING THE AIRSEALING EFFECTIVENESS IN A TURBINE ENGINE

[75] Inventors: Joseph P. Bouchard, Arundel; Merrell W. Long, Waterboro, both of Me.

[73] Assignee: United Technologies Corporation, Hartford, Conn.

[21] Appl. No.: 770,312

[22] Filed: Dec. 20, 1996

Related U.S. Application Data

[62] Division of Ser. No. 625,427, Mar. 26, 1996, Pat. No. 5,630,590.

[51] Int. Cl.$^6$ ............................................. F04D 29/08
[52] U.S. Cl. ..................... 415/170.1; 415/230; 277/53
[58] Field of Search ........................ 415/170.1, 173.6, 415/173.7, 174.2, 229, 230; 277/53

[56] References Cited

U.S. PATENT DOCUMENTS

| | | | |
|---|---|---|---|
| 4,209,268 | 6/1980 | Fujiwana et al. | 277/53 |
| 5,074,748 | 12/1991 | Hagle | 415/170.1 |
| 5,114,159 | 5/1992 | Baird et al. | 415/174.2 |
| 5,181,728 | 1/1993 | Stec | 277/53 |
| 5,201,530 | 4/1993 | Kelch et al. | 277/53 |
| 5,480,165 | 1/1996 | Flower | 277/53 |
| 5,501,573 | 3/1996 | Sanders | 277/53 |
| 5,522,698 | 6/1996 | Butler et al. | 415/170.1 |

*Primary Examiner*—John T. Kwon
*Attorney, Agent, or Firm*—Kenneth C. Baran

[57] ABSTRACT

A gas turbine engine having coannular components 22, 30 includes means for receiving and retaining a replaceable brush seal 60 so that the seal bristles impede the leakage of air through an intercomponent gap 41. In the preferred embodiment one of the components is a hollow, cylindrical barrel 30 comprising upper and lower barrel segments and the receiving and retaining means includes a retainer 52. The retainer cooperates with the barrel to define a groove 56 within which the brush seal is trapped radially and axially. The brush seal slides circumferentially within the groove to facilitate seal installation and removal.

3 Claims, 3 Drawing Sheets and to a method of upgrading
METHOD AND APPARATUS FOR IMPROVING THE AIRSEALING EFFECTIVENESS IN A TURBINE ENGINE This application is a division of application Ser. No. 08/625,427 filed Mar. 26, 1996, now U.S. Pat. No. 5,630,590.

TECHNICAL FIELD

This invention relates to a gas turbine engine having improved internal airsealing and to a method of upgrading the airsealing effectiveness in an existing turbine engine.

BACKGROUND OF THE INVENTION

Gas turbine engines contain a variety of seals to prevent the leakage of working medium air out of the main flowpath of the engine. Minimization of leakage is important since leakage degrades the efficiency of the engine thereby increasing the engine's fuel consumption and cost of operation. Moreover, pressurized air which escapes from the flowpath has an elevated temperature and may come in contact with engine components whose tolerance for such temperatures is limited.

Knife edge seals are commonly used to seal the annular gap between rotating and nonrotating coannular components in turbine engines. A knife edge seal is a ring of material extending radially from a nonrotating component toward a seal land on a neighboring, coannular rotating component (or from the rotating component toward the nonrotating component). The knife edge ring terminates in close proximity to the seal land to inhibit the leakage of air through the annular gap. During engine operation the knife edge ring can contact the rotating seal land due to imbalance of the rotating component, differential thermal response of the components, or imperfections in the concentricity or dimensions of the components. Such contact erodes the knife edge ring and the seal land and diminishes the effectiveness of the seal. Moreover, operational experience suggests that most of the seal degradation occurs quite early in the life of an engine. Accordingly, the engine operates with a deteriorated seal throughout much of its life.

The seal effectiveness can be restored by removing the engine from service, replacing or renovating the knife edge ring and renovating the seal land. Unfortunately this is time consuming and expensive and results in the loss of revenue while the engine is out of service. Furthermore, the renovated seal is no more durable than the original seal, therefore the need to replace or renovate the seal recurs periodically throughout the life of the engine.

What is needed is an improved, easily replaceable intercomponent seal for a turbine engine and an effective, inexpensive and simple method for augmenting the effectiveness of worn knife edge seals in existing turbine engines.

SUMMARY OF THE INVENTION

It is therefore an object of the invention to effectively seal an annular gap between rotating and nonrotating coannular components in a gas turbine engine and to do so with a seal which is easily replaceable when the seal becomes worn.

It is a further object that the seal be easily installable in existing engines to augment the effectiveness of worn knife edge seals.

According to the invention, a hollow, substantially cylindrical barrel comprising upper and lower barrel segments includes means for radially retaining and axially trapping a segmented brush seal. The brush seal segments extend toward a neighboring rotor to seal an annular gap between the barrel and the rotor, and the brush seal segments are slidably installable and removeable upon separaton of the upper barrel segment from the lower barrel segment.

The invention is advantageous in several respects. The brush seal is inherently more wear resistant than a knife edge seal. However if subsequent replacement of the brush seal is necessary it is easily and conveniently accomplished with minimal disassembly of the engine. The brush seal is also installable in existing engines having worn knife edge seals after only minimal reconfiguring of the barrel. The brush seal augments the existing, worn knife edge seal so that expensive and time consuming replacement or renovation of the knife edge ring and seal land is avoided.

These advantages and the features of the invention will become more apparent in light of the following description of the best mode for carrying out the invention and the accompanying drawings

BEST MODE FOR CARRYING OUT THE INVENTION

Figure 1:
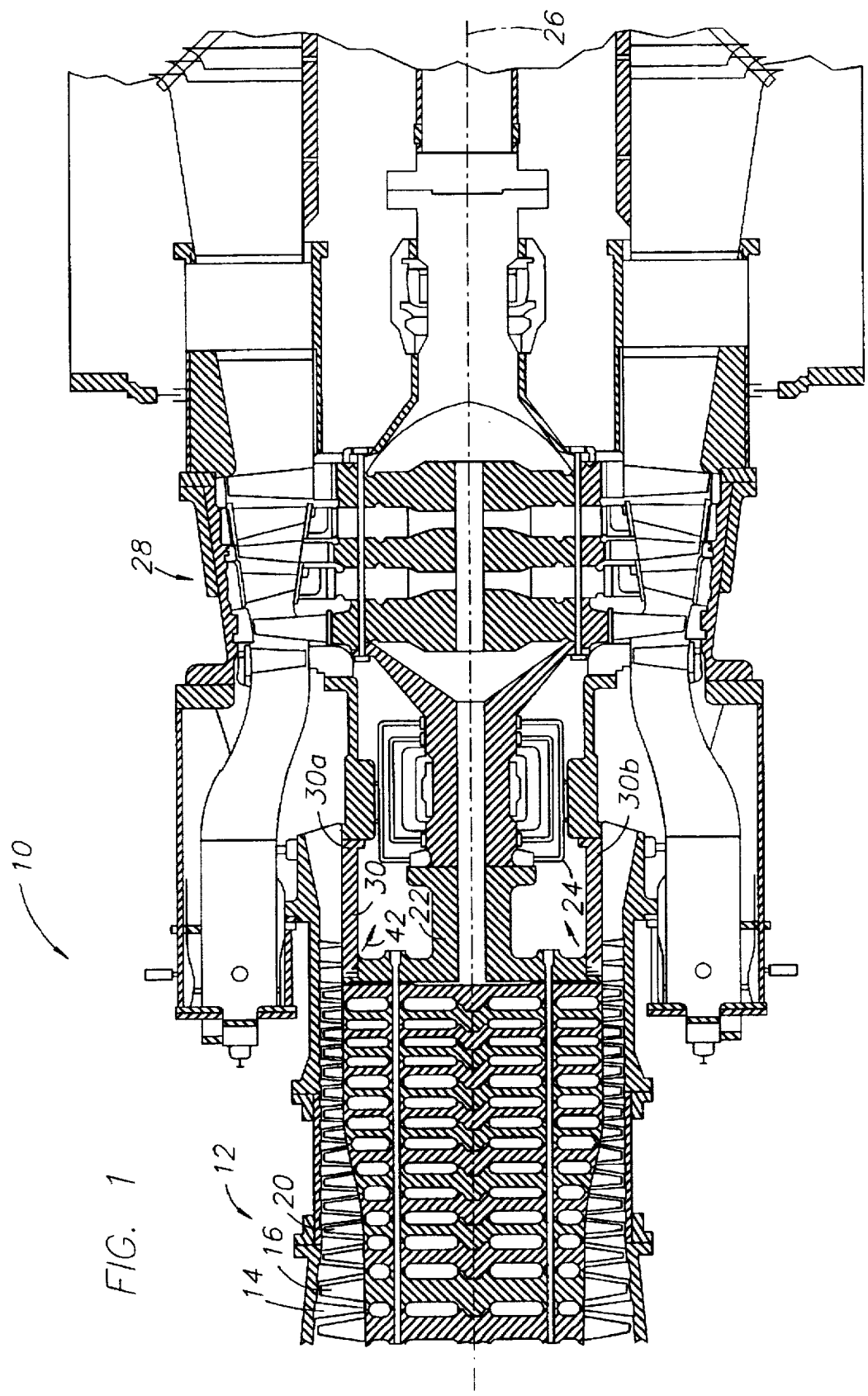
FIG. 1 is a schematic, cross sectional side view of a portion of a turbine engine of a type used for electrical power generation.

FIG. 1 illustrates a portion of a turbine engine 10 of a type used for electrical power generation. The engine includes a compressor 12 having nonrotating stator vanes such as vane 14 and rotating blades such as blade 16 extending radially across a main flowpath 20. A compressor rotor assembly 22, supported by bearings housed within a bearing compartment 24, rotates about a central axis 26 to transfer rotational energy from a turbine 28 to the compressor blades. A nonrotating, substantially cylindrical, hollow drum or barrel 30 circumscribes the bearing compartment and extends forward to form the inner flowpath boundary at the rear end of the compressor. The barrel comprises upper and lower half-barrels or segments 30a, 30b separably secured together by bolts, not shown, extending vertically through the upper segment (half-barrel) and threaded into the lower segment (half-barrel).

Figure 2:
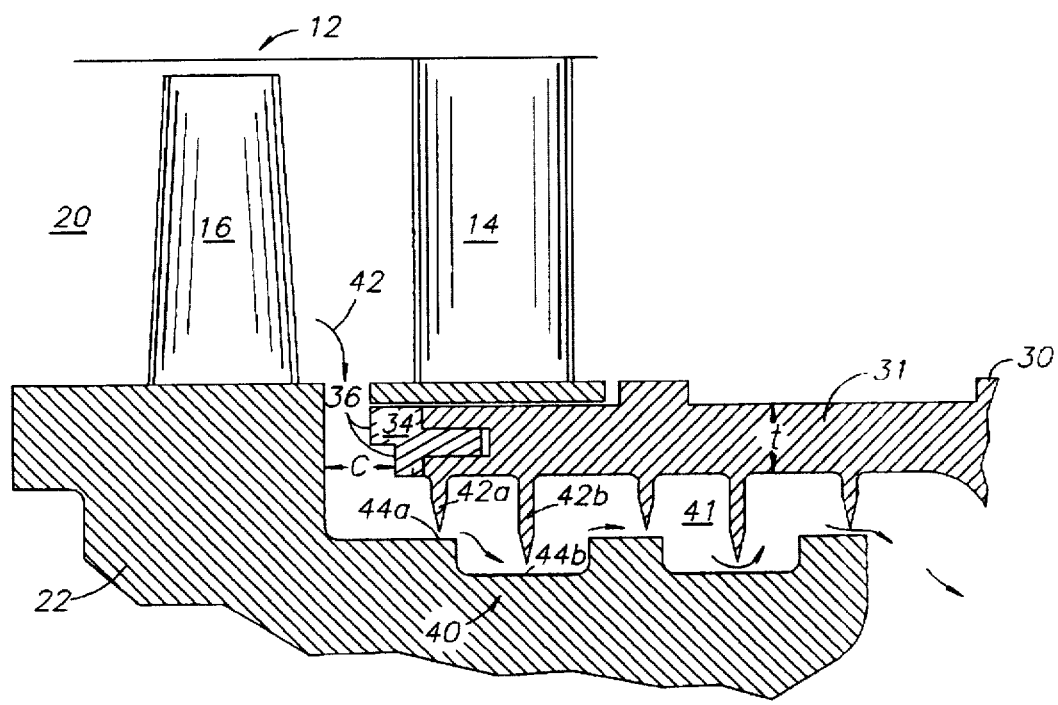
FIG. 2 is a more detailed cross sectional side view of the compressor discharge region of the engine of FIG. 1 showing an array of knife edge seals between a rotating compressor rotor and a neighboring nonrotating barrel having an insert ring at its forward end.
Figure 3:
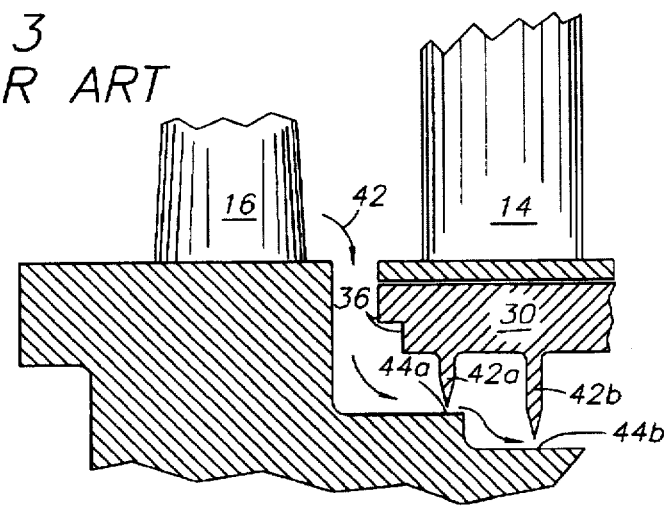
FIG. 3 is a view similar to that of FIG. 2 wherein the barrel is of unitary construction at its forward end.

Referring to FIG. 2, additional features of the rotor 22 and barrel 30 are illustrated in greater detail. The barrel 30 extends forwardly so that its forward end 31 axially overlaps a portion of the rotor 22. The barrel is hollow and substantially cylindrical and has a cylinder wall of thickness t in the vicinity of the forward end 31. An insert ring 34 may be attached to the forward end of the barrel to augment the barrel's length; alternatively the forward end of the barrel may be unitary as shown in FIG. 3. In either case, a face 36 defines the forwardmost extremity of the barrel.

The rotor 22 and the forward end 31 of the barrel 30 cooperate to form a seal 40 in the annular gap 41 between the barrel and the rotor. The seal 40 comprises an array of knife edge seals (such an array is commonly referred to as a labyrinth seal). Each knife edge seal comprises a knife edge ring, such as representative rings 42a, 42b, extending radially inwardly from the barrel 30 and into close proximity to a seal land such as representative lands 44a, 44b on the rotor. The seal inhibits the leakage of air 42 out of the flowpath and into the vicinity of the bearing compartment 24 (FIG. 1).

During engine operation (and particularly during a brief break-in period early in the engine's life) the knife edge rings can contact the rotating seal lands because of imbalances, imperfections and thermal response differences inherent in even a properly functioning engine. Such contact erodes the knife edge rings and the seal lands and rapidly degrades the effectiveness of the seal. As a consequence engine efficiency diminishes with a corresponding increase in fuel consumption and operating cost. Furthermore, the bearing compartment (FIG. 1), which operates at an elevated temperature, is exposed to detrimental quantities of hot air thereby increasing the risk of extensive temperature related damage. It may be possible to renovate the worn seals or replace them with new seals of the same type. Since most of the wear occurs during the brief break-in period following renovation or replacement there is little long term benefit. Moreover either option is expensive and time consuming and the revenues lost while the engine is out of service can be considerable.

According to the invention, the forward end of the barrel includes a replaceable brush seal in lieu of or in tandem with one or more knife edge rings to maximize both engine efficiency and the time interval between seal refurbishments or replacements. The brush seal is mounted on the nonrotating barrel rather than on the rotor to avoid exposing the brush seal to tremendous rotational forces. Because brush seals have inherently better sealing characteristics than knife edge seals, the seal is at least as effective as a knife edge seal. Moreover, brush seals have an inherent wear resistance so that the time interval between subsequent seal replacements is maximized. When used to augment an existing knife edge seal, the expense and revenue loss associated with periodically renovating or replacing the knife edge seals is therefore minimized.

Figure 4:
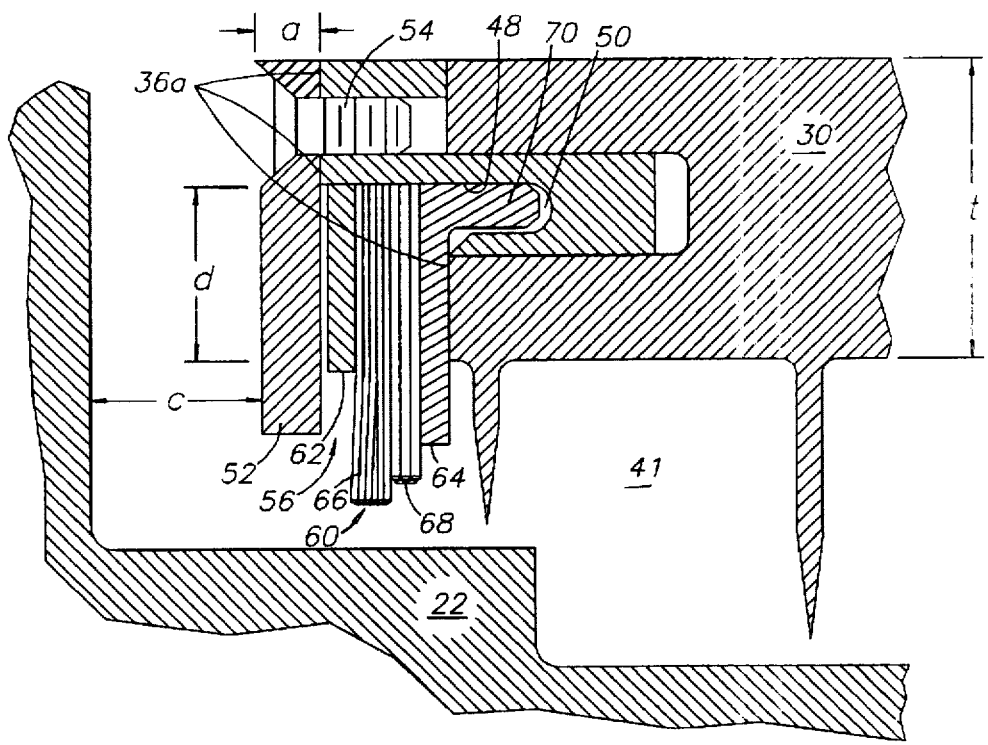
FIG. 4 is a view similar to that of FIG. 2 showing a brush seal installed on the barrel according to the preferred embodiment of the invention.

Although the invention ensures effective and durable airsealing in newly produced engines, it is also beneficial in that it is adaptable to existing engines having worn, ineffective knife edge seals. To apply the invention to such an engine, the bolts securing the upper and lower barrel segments 30a, 30b (FIG. 1) to each other are removed, and the segments are individually removed from the engine. The barrel segments are reconfigured to provide a means for receiving and retaining a brush seal. The reconfiguring includes machining the face 36 (FIG. 2 or FIG. 3) of each barrel segment to reduce the barrel's axial length by a predetermined amount α and to reduce the wall thickness t by a predefined amount d in the vicinity of the face. Referring to FIG. 4, the machining exposes a new face 36a and forms a seal seat 48 on the barrel wall. A circumferentially extending capture slot 50 is machined into the newly exposed face 36a and a retainer 52 is attached to the face 36a by threaded fasteners 54 or by other suitable means such as welding. The retainer 52 cooperates with the face 36a and the seal seat 48 to define a circumferentially extending groove 56. A brush seal 60 having backing plates 62, 64, seal bristles 66 and backing bristles 68 is installed so that the bristles extend toward the rotor to impede the flow of air through the gap 41. Radial retention of the brush seal is accomplished by the seal seat 48 and by engagement between foot 70 on the backing plate 64 and the capture slot 50. The seal is axially trapped between the face 36a and the retainer 52.

The predetermined amount α by which the barrel is shortened is at least as much as the thickness of the retainer 52, and in the preferred embodiment equals the thickness of the retainer 52. Consequently, the reconfiguring of the barrel does not diminish the axial clearance c between the rotor 22 and the retainer 52 and therefore does not raise the risk of contact between the rotor and the barrel (caused, for example, by axial shifting of the rotor or thermal growth differences between the rotor and the barrel during engine operation). In the event that a reduction in the clearance c between the barrel and the rotor is tolerable, the amount of machining can be reduced or even eliminated.

The predefined amount d by which the thickness of the barrel is reduced establishes sufficient radial space for the brush seal. The use of a radially shorter brush seal could reduce or even eliminate the need to reduce the wall thickness. However longer brush seals are preferred since short brush seals have insufficient bristle resilience to form a reliable and effective seal. Reducing the barrel wall thickness to accommodate the length of the brush seal may be unnecessary if the existing gap 41 is large enough to accommodate the brush seal or if advances in brush seal technology produce short seals having adequate resilience and sealing effectiveness.

The reconfiguration of the barrel does not include the removal (for example by machining) of existing knife edge rings. Leaving existing knife edge rings a place is beneficial since the effort and expense associated with their removal is avoided. Moreover, any reconfiguring operation carried out on the barrel involves some risk of inadvertently damaging it. Since the barrel is an expensive component, it is advantageous to avoid, as far as possible, any operations which carry the risk of damage. Finally, the knife edge seals, despite being worn, may have some residual sealing effectiveness.

While the above discussion is directed to the reconditioning of an existing barrel, it will be appreciated that similar means for receiving and retaining a brush seal can be easily incorporated into newly produced engines as well. For example, a barrel may be manufactured with a seal slot 48, barrel face 36a and capture slot 50 which cooperate with a retainer 52 to axially trap and radially retain a brush seal 60. Moreover, these features can be provided in lieu of or in addition to the knife edge rings (e.g. rings 42a, 42b).

Figure 5:
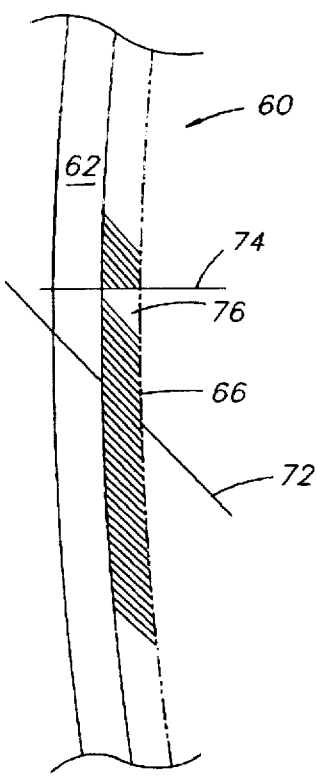
FIG. 5 is a front view of a portion of a brush seal illustrating the segmentation of the seal parallel to the seal bristles.

Because the barrel comprises upper and lower barrel segments, each segment subtending approximately 180 degrees of arc, the retainer 52 also comprises two 180 degree segments. The brush seal is also segmented to facilitate its installation and removal as discussed below, and comprises a single 180 degree upper segment and one or more lower segments, the lower segments collectively subtending 180 degrees of arc. Such a seal is typically manufactured as a full ring, a portion of which is illustrated in FIG. 5, and is subsequently cut into segments. The cuts are made parallel to the bristles, e.g. along the cut line 72. A cut at any other orientation, for example along radial line 74, will liberate a quantity of bristles as shown by triangular void 76 and compromise the effectiveness of the brush seal.

The brush seal segments 60 may be inserted axially (i.e. parallel to axis 26) into the capture slot 50 prior to attachment of the retainer 52 to the face 36a. In the preferred embodiment, the retainer is attached first and the segments are slid circumferentially into the groove 56. The groove is slightly oversized with respect to the brush seal segment so that the seal segment slides easily in the groove. The loose fit between the brush seal and the groove also guards against any excessive stresses which may develop due to differential thermal response. In the preferred embodiment, brush seal installation is further facilitated by using two lower brush seal segments, each extending approximately 90 degrees, rather than a single 180 degree segment. A single 180 degree brush seal segment is used on the upper barrel because smaller segments can easily slide out of the groove when the upper barrel segment is oriented with the groove ends facing downward in preparation for uniting the upper barrel segment with the lower barrel segment.

Depending on the operating gas pressures in the engine, the brush seal may be a multilayered brush seal having at least two layers of bristles (seal bristles and backing bristles) or a unilayer brush seal (one having seal bristles, but no backing bristles). The brush seal of the preferred embodiment is a multilayered brush seal. Such a seal is more completely described in U.S. Pat. No. 5,201,530. In the context of the present invention it is sufficient to appreciate that the multilayered brush seal has a layer of seal bristles 66 and a layer of shorter, thicker backing bristles 68 sandwiched between two backing plates 62, 64. Because of the pressure difference across the seal, the seal bristles tend to deflect toward the low pressure side of the seal (toward the gap 41 in FIG. 4). The shorter, thicker backing bristles, being less resilient than the seal bristles, resist deflection of the seal bristles to preserve the integrity of the seal. Any tendency of the backing bristles to deflect is similarly resisted by the backing plate 64. If a unilayer brush seal were used, its backing plate would have to be longer, in proportion to the seal bristles, than the backing plate of a multilayered seal in order to adequately support the seal bristles. Because of the long backing plate, any radial shifting of the rotor due to imbalances or thermal growth (commonly referred to as rotor excursions) can result in contact between the backing plate and the rotor, resulting in damage to both. The risk of damage is diminished by the multilayered brush seal since the resiliency of the backing bristles precludes any damage in the event that they contact the rotor. Thus, the engine benefits not only from the inherent wear resistance of a brush seal, but from the damage resistance of the multilayered brush seal as well.

Replacement of brush seal segments, should they become too worn to be effective, requires that the upper barrel be separated from the lower barrel and removed from the engine. Once the upper barrel is separated from the lower barrel, the worn brush seal segments on either the upper or lower barrel are removed by sliding the segments circumferentially out of the groove and sliding new brush seal segments into place.

We claim:

1. A gas turbine engine component, characterized by:
   a hollow substantially cylindrical barrel comprising upper and lower barrel segments separably secured together and having means for radially retaining and axially trapping a brush seal;
   a brush seal comprising at least two brush seal segments, the brush seal segments being radially retained and axially trapped by the retaining and trapping means;
   wherein the brush seal segments are slidably installable and removable upon separation of the upper barrel segment from the lower barrel segment.

2. The gas turbine engine component of claim 1, characterized in that each barrel segment has a seal seat and a face and said retaining and trapping means comprises a retainer attached to the barrel segments and cooperating with the seal seat and the face to define a circumferentially extending groove, the groove being oversized with respect to the brush seal so that the brush seal segments are slidably installable in and removeable from the groove upon separation of the upper barrel segment from the lower barrel segment.

3. The gas turbine component of claim 2 characterized in that the brush seal is a multilayered brush seal.

* * * * *